(12) United States Patent
Bhardwaj et al.

(10) Patent No.: US 10,021,167 B2
(45) Date of Patent: Jul. 10, 2018

(54) ACCESSING MOBILE DOCUMENTS

(71) Applicant: SAP SE, Walldorf (DE)

(72) Inventors: Anshul Bhardwaj, Bangalore (IN);
Bharathi Narayana Murthy, Bangalore (IN)

(73) Assignee: SAP SE, Walldorf (DE)

( * ) Notice: Subject to any disclaimer, the term of this patent is extended or adjusted under 35 U.S.C. 154(b) by 248 days.

(21) Appl. No.: 14/964,577

(22) Filed: Dec. 10, 2015

(65) Prior Publication Data
US 2017/0171290 A1 Jun. 15, 2017

(51) Int. Cl.
*G06F 15/16* (2006.01)
*H04L 29/08* (2006.01)
*H04W 88/02* (2009.01)
*G06F 17/24* (2006.01)
*G06F 17/22* (2006.01)

(52) U.S. Cl.
CPC .......... *H04L 67/06* (2013.01); *G06F 17/2205* (2013.01); *G06F 17/241* (2013.01); *H04W 88/02* (2013.01)

(58) Field of Classification Search
CPC ... H04L 67/06; G06F 17/2205; G06F 17/241; H04W 88/02
See application file for complete search history.

(56) References Cited

U.S. PATENT DOCUMENTS

| | | | |
|---|---|---|---|
| 2006/0248038 A1* | 11/2006 | Kaplan | G06F 17/3012 |
| 2009/0119576 A1* | 5/2009 | Pepper | G06F 17/241 |
| | | | 715/230 |
| 2011/0072093 A1* | 3/2011 | Wright | G06F 17/241 |
| | | | 709/206 |
| 2012/0331447 A1* | 12/2012 | Nayak | G06F 8/71 |
| | | | 717/120 |
| 2013/0138681 A1* | 5/2013 | Abrams | G06F 17/30566 |
| | | | 707/769 |
| 2013/0159938 A1* | 6/2013 | James | G06F 3/017 |
| | | | 715/863 |

* cited by examiner

*Primary Examiner* — Jonathan A Bui
(74) *Attorney, Agent, or Firm* — Fish & Richardson P.C.

(57) ABSTRACT

Various embodiments of systems and methods for accessing mobile documents are described herein. In an aspect, the method includes receiving a request from a device for creating an analytical file corresponding to a document. Upon receiving the request, a business intelligence archive resource (BIAR) file related to the document and at least one of data, one or more annotations, and one or more operations related to the document is retrieved. The retrieved BIAR file and the at least one of the data, the one or more annotations, and the one or more operations are integrated to create the analytical file corresponding to the document.

19 Claims, 8 Drawing Sheets

ACCESSING MOBILE DOCUMENTS

BACKGROUND

Data related to business processes may be maintained in various document or report formats, for e.g., Excel® sheet format, Word® document format, PowerPoint® presentation format, etc. Usually, the documents are stored at a server. Users such as sales manager, chief executive officer (CEO), chief financial officer (CFO), etc., need connectivity with the server to access or retrieve a document for illustration and/or to data analysis purpose. Sometimes, due to connectivity issues, the users may have to work in offline mode without being connected to the server. However, even when working in the offline mode, the users need to connect to the server at least once to download the document and data. In case of annotated documents, annotation(s) such as highlighting, comments, etc., are stored in a separate file on the server. A connectivity with the server is required to access or retrieve the annotation(s). It might not be feasible to connect to the server at all times, e.g., when the users are at remote customer sites. Therefore, a user may not be able to work in offline mode, to perform data analysis and presentation.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Figure 1:
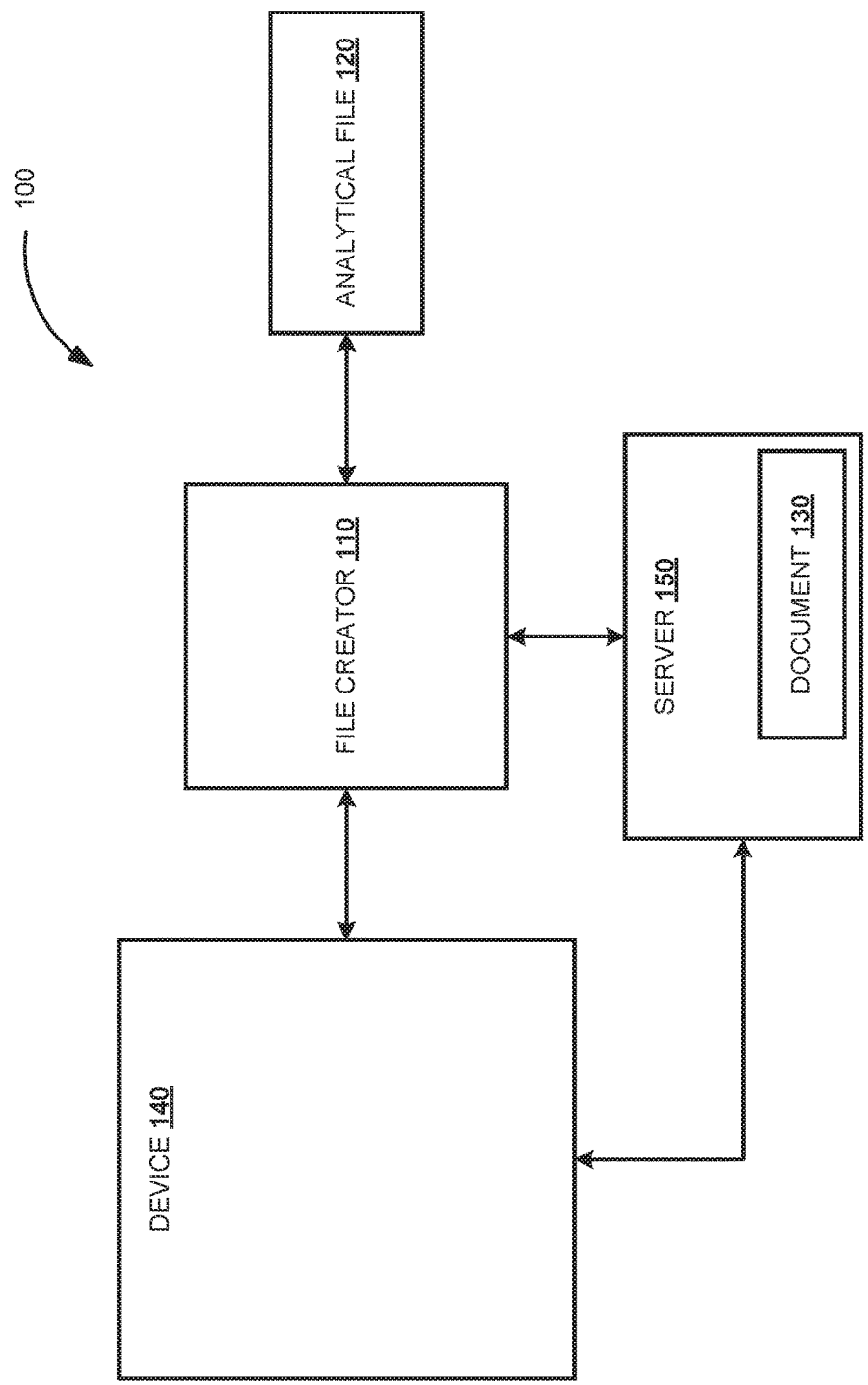
FIG. 1 is a block diagram illustrating an exemplary environment for creating an analytical file corresponding to a document, according to an embodiment.

Embodiments of techniques for accessing mobile document are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Device" refers to a logical and/or a physical unit adapted for a specific purpose. For example, a device may be at least one of a mechanical and/or an electronic unit. Device encompasses, but is not limited to, a communication device, a computing device, a handheld device, and a mobile device such as an enterprise digital assistant (FDA), a personal digital assistant (PDA), a tablet computer, a smartphone, and the like. A device can perform one or more tasks. The device includes computing system comprising electronics (e.g., sensors) and software. The device is uniquely identifiable through its computing system. The device can access internet services such as World Wide Web (www) or electronic mails (E-mails), and exchange information with another device or a server by using wired or wireless communication technologies, such as Bluetooth, Wi-Fi, Universal Serial Bus (USB), infrared and the like.

"Document" or "business document" refers to a piece of written, printed, or electronic matter that provides information and serves as an official record. The document may store data related to a business process. The document may be in a format, e.g., a file, a database table, a report, an Excel® sheet, a PowerPoint® presentation, Microsoft® word® document, a graph, a chart, etc. The document may be maintained, stored, accessed, and/or analyzed on any device. In various embodiment, the document may also be referred as "mobile document," i.e., a document that can be maintained, accessed, stored, and analyzed on a mobile device.

"Data source" refers to a source of data, e.g., business data, related to a document. In an embodiment, a server may be a type of data source which provides data for the document. The data may be stored in a file, a database table, etc. The data source receives requests from a device or software and respond to the request, e.g., by sending requested data. The data on the data source may be maintained as confidential data and may be accessed by registered users and/or device.

"Connection information" or "connection details" refer to credential details of the connection including the server. For example, the connection details include connection name (unique name or ID), type of the server (e.g., HANA® server, business warehouse (BW®) server, etc), name of the server, IP address of the server, etc. in an embodiment, for a connection (connection name), the type of server, the name of server, interact protocol (IP) address of the server, etc., may be defined or predefined by a user. Therefore, when a connection name is selected/provided, the type of server, the name of server, IP address of the server, etc., are automatically provided or populated.

"Business application" or "mobile application" refers to a software program which is used to execute a business process. For example, the business application may be used to access the server to retrieve business data related to the document stored on the server. The business application may be an "on premise" application or may be provided as "on-cloud" solution. The business application may be an interactive application and includes one or more graphical user interfaces (GUIs) to allow users to log-in through the business application to access the server to retrieve or download confidential data. The business application can be installed on any device, e.g., any mobile or portable device, desktop, laptop, etc. In an embodiment, the business application includes a "file creator" to create files of various types.

"Business intelligence archive resource (BIAR)" file refers to a packaging file for managing content in a business objects. The BIAR files are available on BusinessObjects® Enterprise systems. The BIAR file may be used to archive folders and objects in a repository so that they can be easily accessed and transferred to a different location. Therefore, the BIAR file may be used for backups and moving business intelligence (BI®) applications from one location to another location. The BIAR file may be imported (downloaded) and/or exported (uploaded). The BIAR file may include connection information related to the server and metadata related to a document or report.

"Metadata" refers to data about containers of data. The metadata for a report or a document may be defined as fields, columns, or sections which contain data related to an entity. For example, if a report (e.g., a database table) includes employee's information then the fields or columns such as employee name, age, address, contact #, etc., may be defined as metadata which stores or contains data related to an employee. Metadata summarizes information about data and makes searching and working with data easier. Filtering through metadata makes it easier for someone to locate or search specific information.

"Analytical file" refers to a file or a package which includes the document or report, the data related to the document, one or more operations (e.g., drill down, drill up, filter, etc) related to the document or the operations which can be performed on the document, connection details of the server where the document is stored, one or more annotations (e.g. a comment, explanation, presentational markup) attached to text, image, or other data, etc., within the document. In an embodiment, the analytical file includes Business Intelligence Archive Resource (BIAR) file along with the data, the annotations, and the operations. The analytical file may be termed as mobile BIAR (i.e., MBIAR) file. The analytical file may be created, imported, exported, and/or shared, e.g., through a device.

FIG. 1 is a block diagram illustrating exemplary file creating environment 100. The file creating environment 100 includes a file creator 110 for creating an analytical file 120 corresponding to a document 130. The document 130 may be stored on a device 140 and/or a server 150. A user may request the file creator 110 to create the analytical file 120 corresponding to the document 130. In an embodiment, the file creator 110 may be installed on the device 140. Based upon the request, the file creator 110 read, retrieves, and/or downloads information related to the document 130. The information may be read, retrieved, and downloaded from the device 140 and/or the server 150. In an embodiment, some information (e.g., data and annotations related to the document 130) may be retrieved from the server 150 and some information (e.g., metadata and operations related to the document 130) may be retrieved from the device 140.

In an embodiment, the file creator 110 may retrieve metadata related to the document 130 from business intelligence archive resource (BIAR) file stored on the device 140. Once the information related to the document 130 is retrieved, the file creator 110 integrates the retrieved information to create or generate the analytical file 120. In an embodiment, the file creator 110 integrates the BIAR file of the document 130 and at least one of data, annotations, and operations related to the document 130 to create the analytical file 120 corresponding to the document 130. In an embodiment, integrate refers to at least one of linking, packaging together, and connecting. The created analytical file 120 may be saved or stored in a local library or memory (e.g., SQLite) of the device 140. The stored analytical file 120 may be accessed anytime from anywhere through the device 140. Irrespective of the connectivity of the device. The stored analytical file 120 may also be shared with one or more other users.

A user may want to create the analytical file 120 corresponding to a business report or the document 130. The document 130 may be in a format including, but not limited to, a file, a database table, a report, an Excel® sheet, a PowerPoint® presentation, Microsoft® word® document, a graph, a chart, etc. The document 130 may be stored on the device 140 and/or the server 150. The data and one or more annotations (e.g. a comment, explanation, presentational markup) attached to text, image, or other data, etc. corresponding to the document 130 may be stored on the server 150. The metadata, one or more operations (e.g., drill down, drill up, filter, etc) related to the document 130, and connection details of the server 150 may be stored on the device 140. In an embodiment, the metadata and the connection details of the server 150 may be stored in the BIAR file of the document 130 and stored on the device 140.

Figure 2:
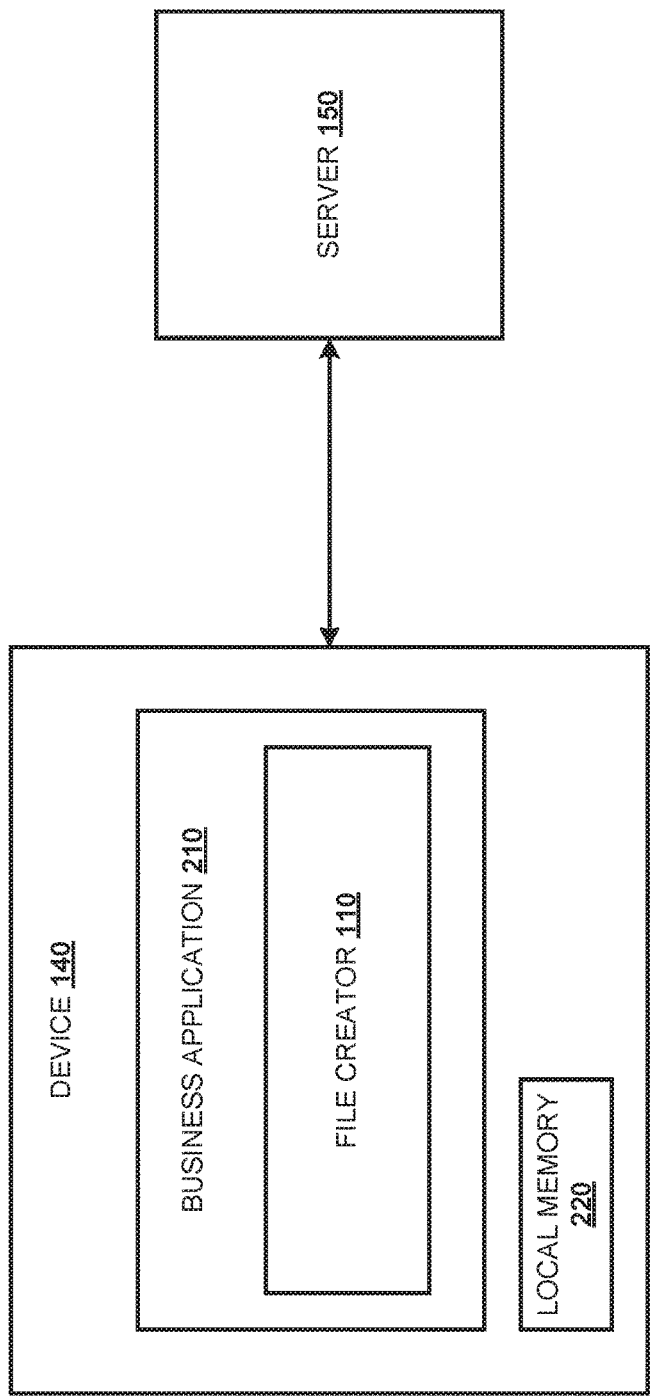
FIG. 2 illustrates an exemplary device including a file creator to retrieve information from a server for creating the analytical file, according to an embodiment.

A request for creating the analytical file 120 may be send through the device 140. The request may be provided through a business application 210 (FIG. 2) included in the device 140. For example, the business application 210 may include a tab "create analytical file" which may be clicked to send the request. In an embodiment, a user may log-in at the business application 210 for sending the request to create the analytical file 120. Once the business application 210 receives the request, the business application invokes the file creator 110 to create the analytical file 120. The file creator 110 access the server 150 and/or the device 140 to retrieve various information to create the analytical file 120. In an embodiment, the file creator retrieves the data, the one or more annotations, and the one or more operations corresponding to the document 130 from the server 150. In an embodiment, the data is retrieved from the server 150 and the other information (annotations, operations, etc) may be retrieved from the device 140. In an embodiment, when the user or the device 140 is not registered with the server 150, an error message may be displayed to restrict accessing the server 150 or create the analytical file 120.

Once the data and information is retrieved, the file creator 110 integrates the data and information to create the analytical file 120. In an embodiment, the file creator 110 integrates the BIAR file related to the document 130, the data, the annotation, and/or the operations related to the document 130 to create the analytical file 120 corresponding to the document 130. In an embodiment, integrate refers to at least one of linking, packaging together, and connecting of different data parameters. The created analytical file 120 may be stored on the device 140. For example, the analytical file 120 may be stored in a local memory 220 (FIG. 2) of the device 140.

Figure 3:
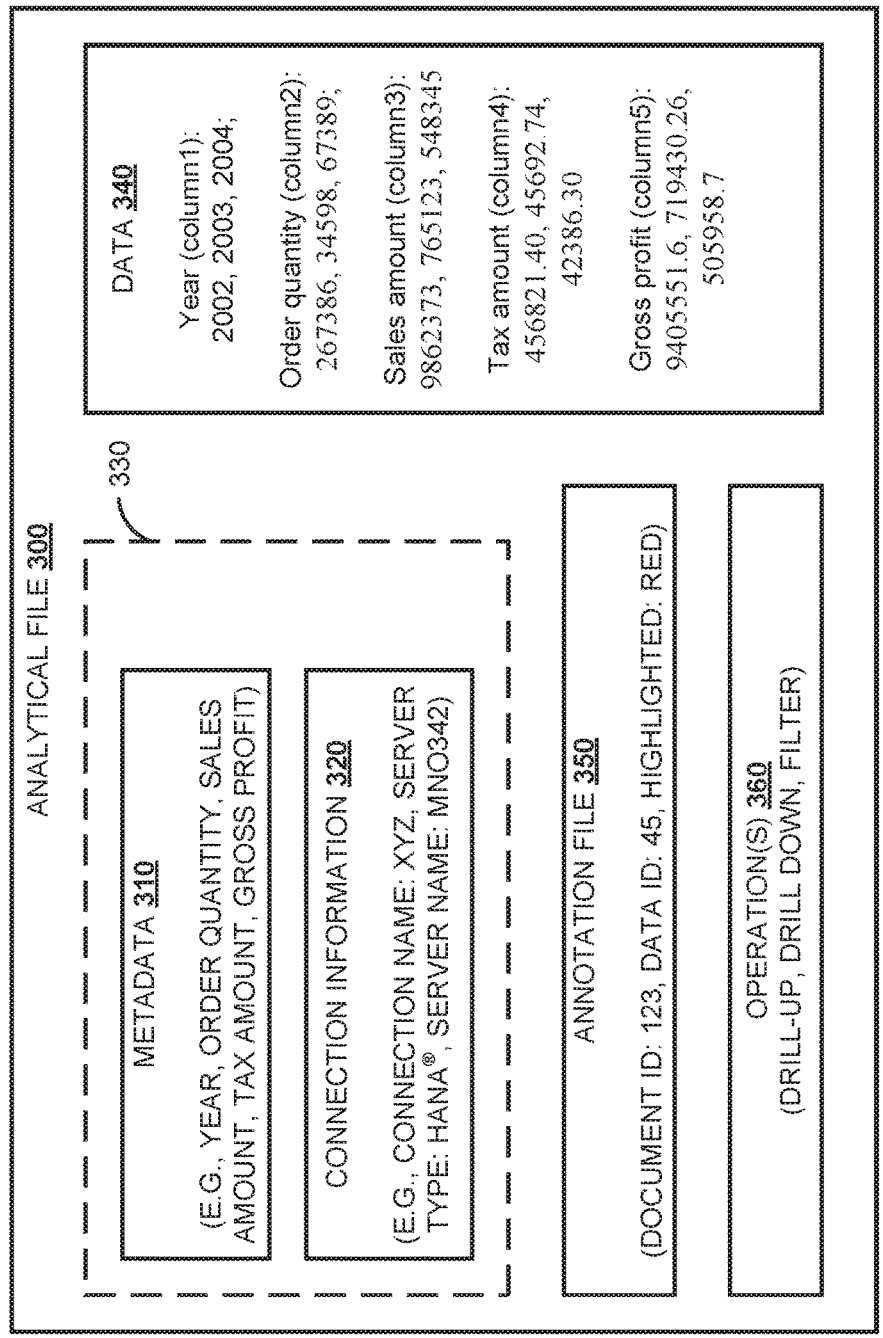
FIG. 3 illustrates an exemplary analytical file, according to an embodiment.

FIG. 3 illustrates an exemplarily analytical file 300 created for 'document1' or a report (related to sales order) shown below. The document and each data within the document has a unique identifier (ID). For example, the document1 may have a unique ID '123' and its data 'year 2004' may have a unique ID '45'.

| | | Document1 | | |
|---|---|---|---|---|
| Year | Order Quantity | Sales Amount ($) | Tax Amount ($) | Gross Profit ($) |
| 2002 | 267386 | 9862373 | 456821.40 | 9405551.6 |
| 2003 | 34598 | 765123 | 45692.74 | 719430.26 |
| 2004 | 67389 | 548345 | 42386.30 | 505958.7 |

The analytical file 300 includes metadata 310 related the document1. For example, the metadata 310 comprises 'year,' 'order quantity' 'sales amount' 'tax amount,' and 'gross profit.' The analytical file 300 also includes a connection information 320 related to the server storing the document1. For example, the connection details 320 comprises connection name: 'xyz,' server type: HANA®, server name: 'MNO342' etc. In an embodiment, the metadata 310 and the connection information 320 may be retrieved from a BIAR file 330 of the document1. The BIAR file 330 may be stored in a local memory (e.g., the local memory 220 of FIG. 2) of the device (e.g., the device 140). In an embodiment, the analytical file 300 may include the BIAR file 330 (including the metadata 310 and the connection information 320) along with information (e.g., data 340 and annotation 350) from the server MNO342. In an embodiment, the analytical file 300 which includes the BIAR file 330 may be termed as an extended. BIAR (EBIAR) file or mobile BIAR (MBIAR) file.

The data 340 related to the metadata 310 or the document1 may be retrieved from the server MNO342. The data 340 may include values corresponding to metadata. For example, the data 340 includes values or data '2002, 2003, and 2004' corresponding to the metadata 'year,' '267386, 34598, and 67389' corresponding to the metadata 'order quantity,' '9862373, 765123, and 548345' corresponding to the metadata 'sales amount,' '456821.40, 45692.74, and 42386.30' corresponding to the metadata 'tax amount,' and '9405551.6, 719430.26. and 505958.7' corresponding to the metadata 'gross profit.' The analytical file 300 also includes an annotation file 350 comprising one or more annotation related to the document1. The annotation file 350 may be retrieved from the server MNO342. The annotation file 350 includes annotation such as "highlight with highlight color," "comment with comment content," etc. For example, if year 2004 in document1 is highlighted in red color, then annotation file 350 includes annotation as "document ID: 123, data ID: 45, highlighted: RED." In an embodiment, there may be a single file including all annotations related to the document1. In an embodiment, there may be separate annotation file corresponding to each annotation. In an embodiment, the annotation file 350 may be an image file. In an embodiment, the annotation file has unique ID which is linked to the document ID, e.g., document ID. The data 340 and the annotation file 350 may be retrieved from the server MNO342. The analytical file 300 further includes one or more operations 360 performed on the document1. For example, the analytical file 300 may include operations such as drill-up, drill-down, filter etc. The operations performed on the document1 may be stored and retrieved from the server MNO342 or the device.

Once the analytical file (e.g., the analytical file 300) is created and the user performs one or more operations (e.g., drill up, drill down, filter, etc) upon the document1, the analytical file 300 corresponding to the document1 updates itself accordingly. The analytical file 300 is updated based upon the operations performed on the corresponding document1. A visual representation such as a graph, a pie chart etc., created corresponding to the document1 may be shared through the analytical file 300. In an embodiment, the analysis (in the form of graph, chart, etc), the operations, and visual representation is stored or saved as a part of the analytical file 300. The stored analytical file 300 may be updated and shared or sent to one or more recipients. For example, the business application 210 includes options for sharing the analytical file 300 through, e.g., an email, social media sites, and enterprise communicator, etc. The user can select the option and share the analytical file 300. The recipients can view the received analytical file 300 and can also perform operations upon the document1 included in the analytical file 300.

Figure 4:
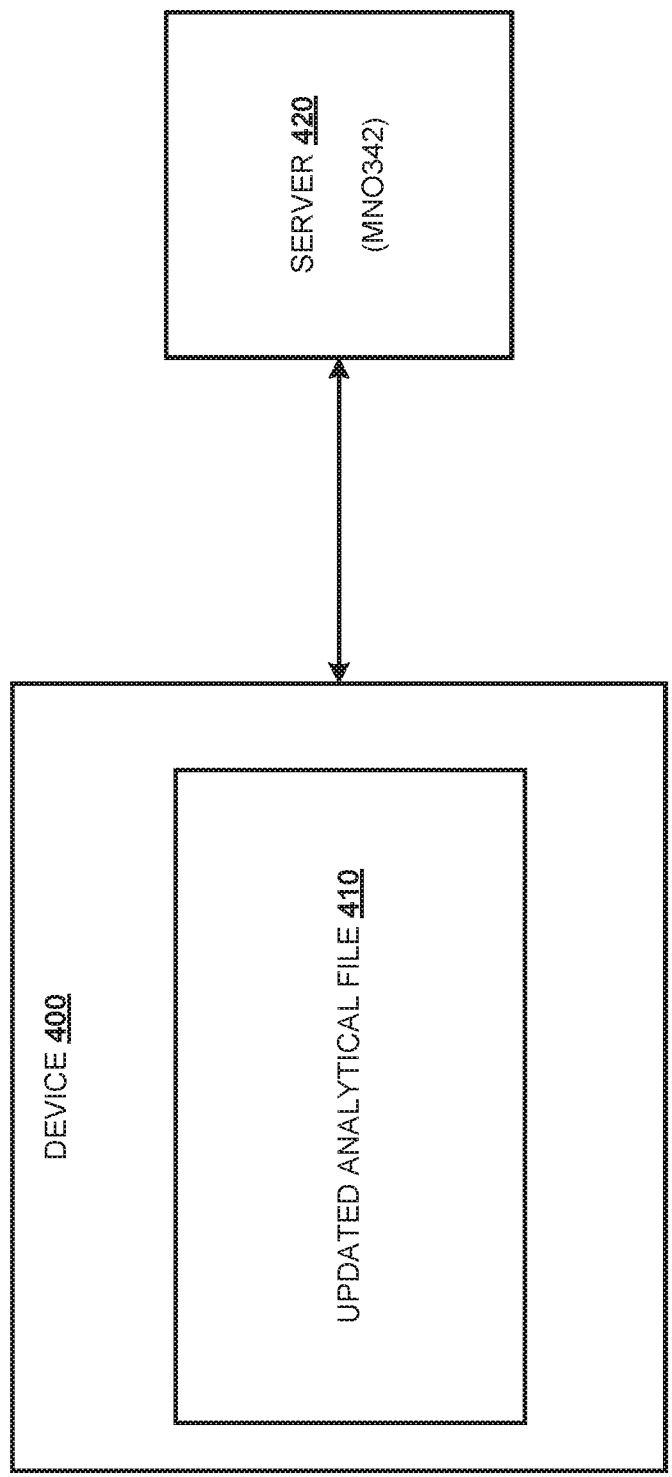
FIG. 4 is a block diagram illustrating the device connected to the server for uploading the analytical file onto the server, according to an embodiment.

The user, e.g., the recipients, may further perform analysis and further update the analytical file 300. An updated analytical file 410 (FIG. 4) stored on a device of the recipient, e.g., on a device 400, may be uploaded on the server 420 (name: MNO342). In an embodiment, the business application 210 (installed on the device 400) determines whether the connectivity with the server 420 is stored/restored. Upon determining the connectivity with the server 420, the business application 210 automatically uploads the updated analytical file 410 from the device 400 to the server 420. In an embodiment, the business application 210 may provide an option to manually upload the updated analytical file 410 whenever there is network connectivity. In an embodiment, the business application 210 notifies the user about the network connectivity for the user to upload the updated analytical file 410 from the device 400 to the server 420. Therefore, the analytical file 300 on the server 420 is synchronized with the updated analytical file 410.

Figure 5:
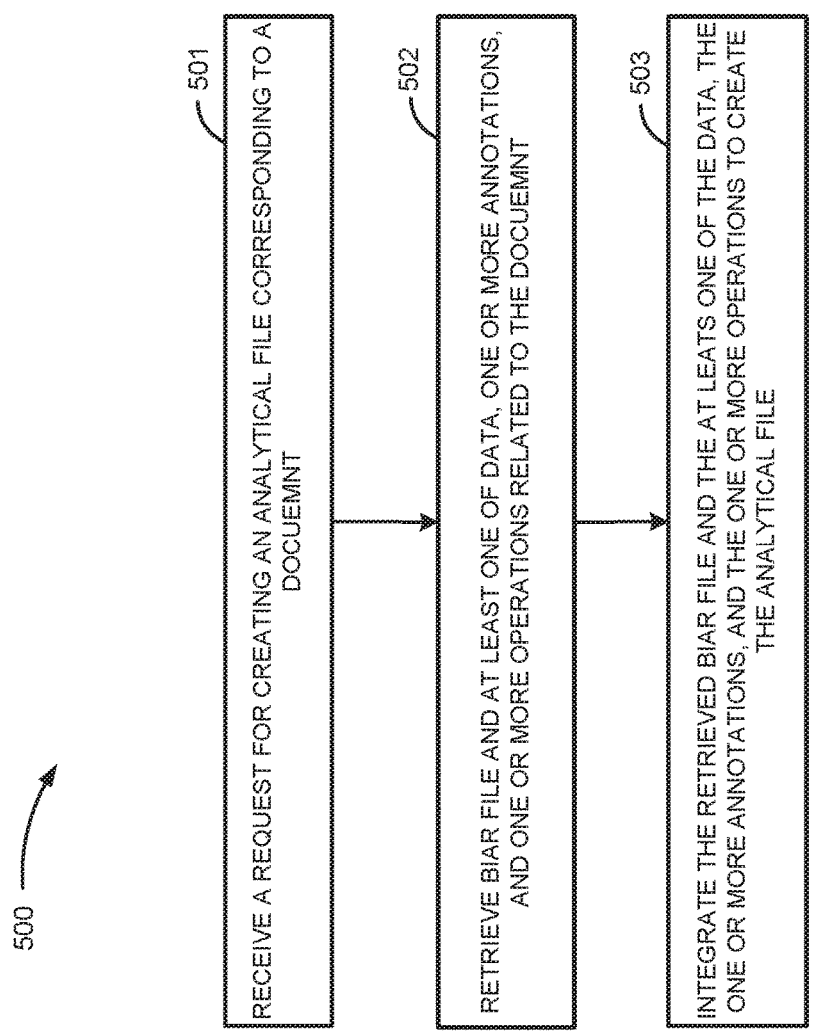
FIG. 5 is a flowchart illustrating a process of creating an analytical file corresponding to a document, according to an embodiment.

FIG. 5 is a flowchart illustrating process 500 to create an analytical file (e.g., the analytical file 120 of FIG. 1) corresponding to a document (e.g., the document 130 of FIG. 1). At 501, a request for creating the analytical file is received by a file creator (e.g., the file creator 110 of FIG. 1). The request may be received through a business application installed on a device (e.g., the device 140 of FIG. 1). Once the request is received, the file creator is invoked by the business application. In an embodiment, the file creator is a part of the business application. The file creator reads or retrieves the information corresponding to the document. The information includes, but not limited to, metadata, data, annotation(s), and operation(s) related to the document. At 502, the file creator reads the BIAR file and at least one of the data, one or more annotations, and one or more operations related to the document. In an embodiment, some of the information such as metadata and connection information of a data source or a server may be retrieved from the BIAR file of the document stored on the device and some of the information such as data, annotations and operations may be retrieved from the data source or the server (e.g., the server 150 of FIG. 1). At 503, the retrieved information is integrated to create the analytical file. In an embodiment, integrate refers to at least one of connect, combine together as a package, and link. In an embodiment, the BIAR file itself is integrated or packaged with the other information of the document to create the analytical file.

Figure 6:
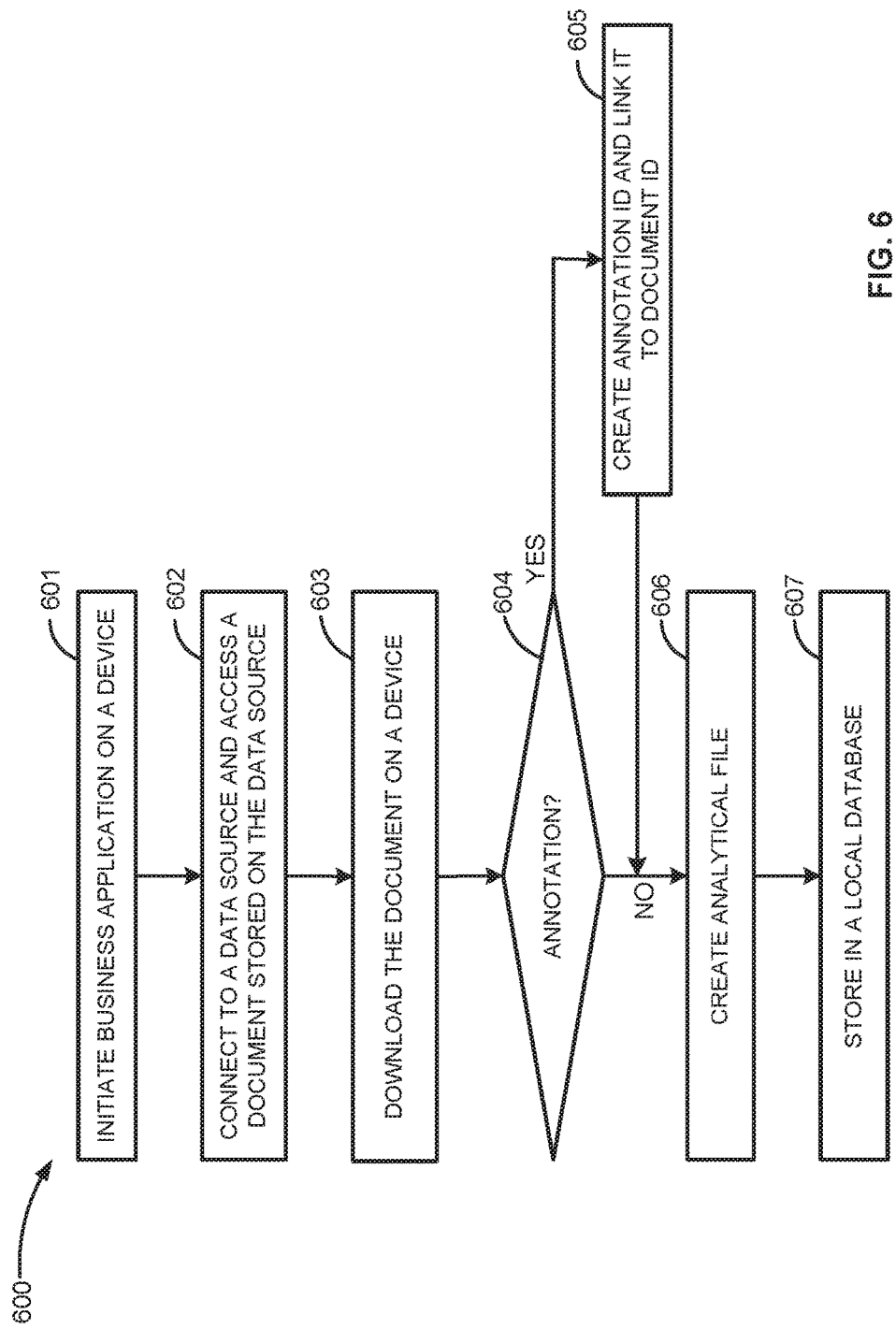
FIG. 6 is a flowchart illustrating a process of associating annotation with a document to create the analytical file corresponding to the document, according to an embodiment.

FIG. 6 is a flowchart illustrating process 600 to associate annotation(s) with its corresponding document or report to create analytical file. At 601, the user initiates the business application (mobile application). In an embodiment, initiates may refer to opening the business application. Once the business application is initiated or opened, the user may log-in through the business application to connect to the data source or the server to access or retrieve document or report stored on the data source (e.g., enterprise server) at 602. At 603, the user performs analysis on the document or update the document and downloads the updated document on the device. Once the document is downloaded on the device, it is determined whether there is any annotation(s) associated with the document at 604. When the annotation(s) is associated with the document (step 604: YES), the file creator creates an annotation identifier (ID) and link the annotation ID to a document ID at 605. Each document also has a unique ID. In an embodiment, the annotation(s) may be saved as image file having a unique ID and the image file ID is linked to the document ID. The document is integrated or linked (e.g., using their IDs) with at least one of annotation(s), data, and operation to generate or create the analytical file at 606. The created analytical file may be saved or stored at 607 (e.g., on a local database of the device).

The created analytical file may be saved, shared with one or more recipients (e.g., through email, social media sites, enterprise communicator, etc.), and/or analyzed. The analytical file may be saved, shared, and analyzed without being connected to the internet as the analytical file includes the information for performing any of these operations and does not require any information from the server. The user may perform one or more further operations on the analytical file to update the file. For example, the user may drill down or perform filter operation on data to update the file. The updated file may be saved on the device and/or may be automatically or manually uploaded on the server when connectivity with the server is restored so that the file on the device and server is maintained in synchronization.

Figure 7:
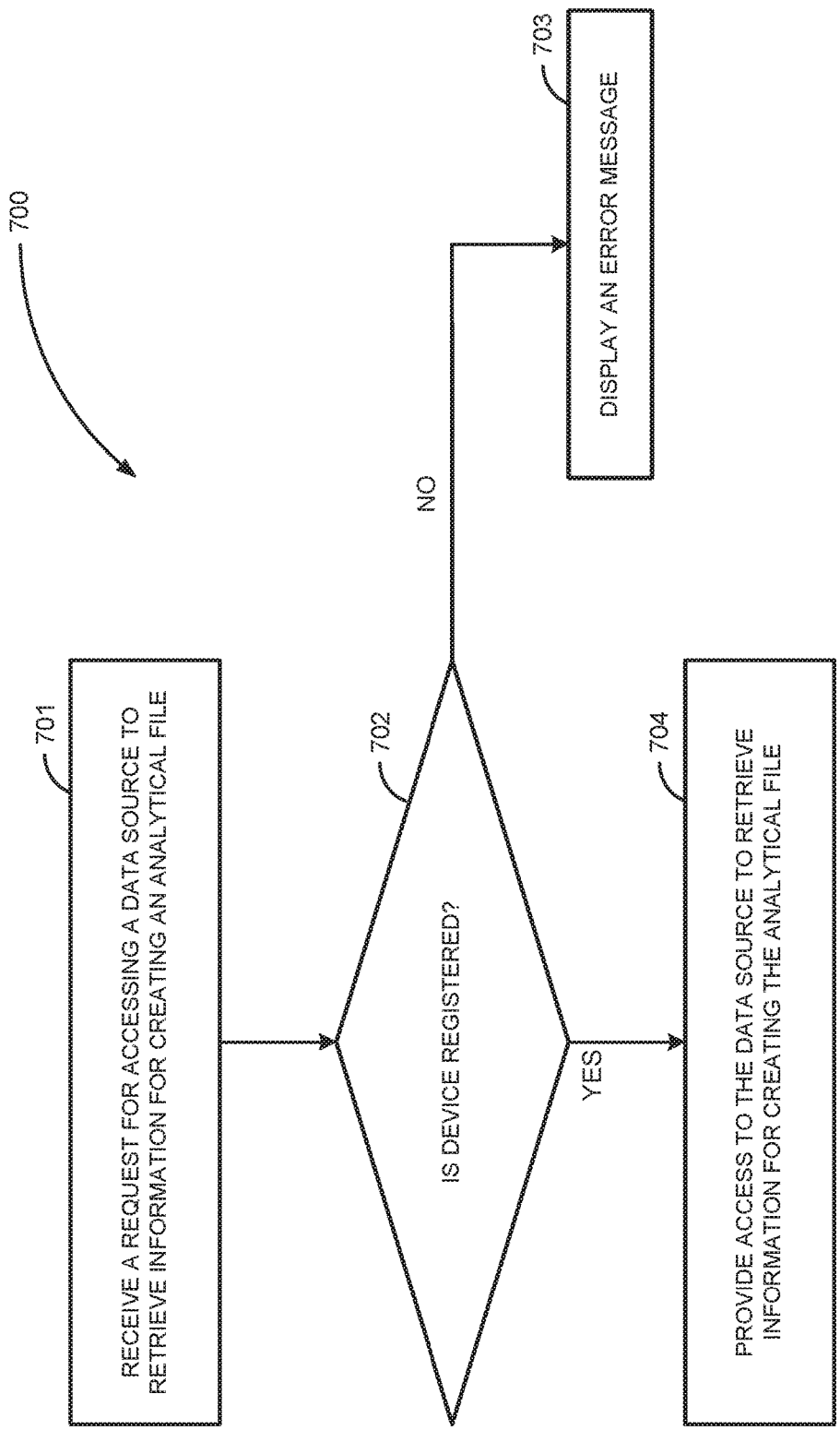
FIG. 7 is a flowchart illustrating a process of retrieving information from a server for creating the analytical file, according to an embodiment.

FIG. 7 is a flowchart illustrating process 700 to retrieve information for creating the analytical file. At 701, a request is received for accessing the data source (e.g., the server) to retrieve or read information related to the document to create the analytical file corresponding to the document. In an embodiment, the information comprises at least one of the data, the one or more annotations, and the one or more operations. The request is received through the device. Once the request is received, it is determined whether the device is registered at 702. In an embodiment, it is determined whether a user requesting to access the data source is a registered user. In an embodiment, it is determined if the user or the device is registered by verifying the user's credentials such as log-in ID and password. When the device is not registered (step 702: NO), an error message is displayed at 703. When the device is registered (step 702: YES), the device access the data source and retrieves or reads the information to create the analytical file at 704.

Embodiments enable users (e.g., CEO, CFO, sales manager, etc) to create an analytical file or package including a business document or report, its data, annotation(s), connection details of server where the business document is stored, BIAR file content of the business document, and operation(s) related to the business document. The analytical file can be saved locally on any device (portable or mobile device, desktop, laptop, etc). The user can easily retrieve or access the analytical file (including the business report, data, annotation, and operations, etc) from the device without being connected to the server. Therefore, the document and its related information, e.g., the data, annotations, operations, BIAR file content, analysis, charts or graphs, etc., can be retrieved, shared, and/or presented anywhere and at any time, without worrying about connectivity issues with the server. The analytical file enable performing analysis and presentation on the data even from remote areas where there is no Internet connectivity to retrieve information from the server. Further, the analytical file can be modified or updated and can be easily shared, e.g., through email. The recipients of analytical file or email can easily download and view the business document, its data, annotations, and analysis results in the form of a graph, chart, etc. The recipients can also perform the operations included in the analytical file. The updated analytical file may be synchronized with the analytical file stored on the server. The updated analytical file can be uploaded (automatically or manually) on the server whenever there is connectivity with the server. Therefore, the embodiments provide an efficient and flexible technique which can be used to perform data analysis and presentations without being connected to internet or server.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
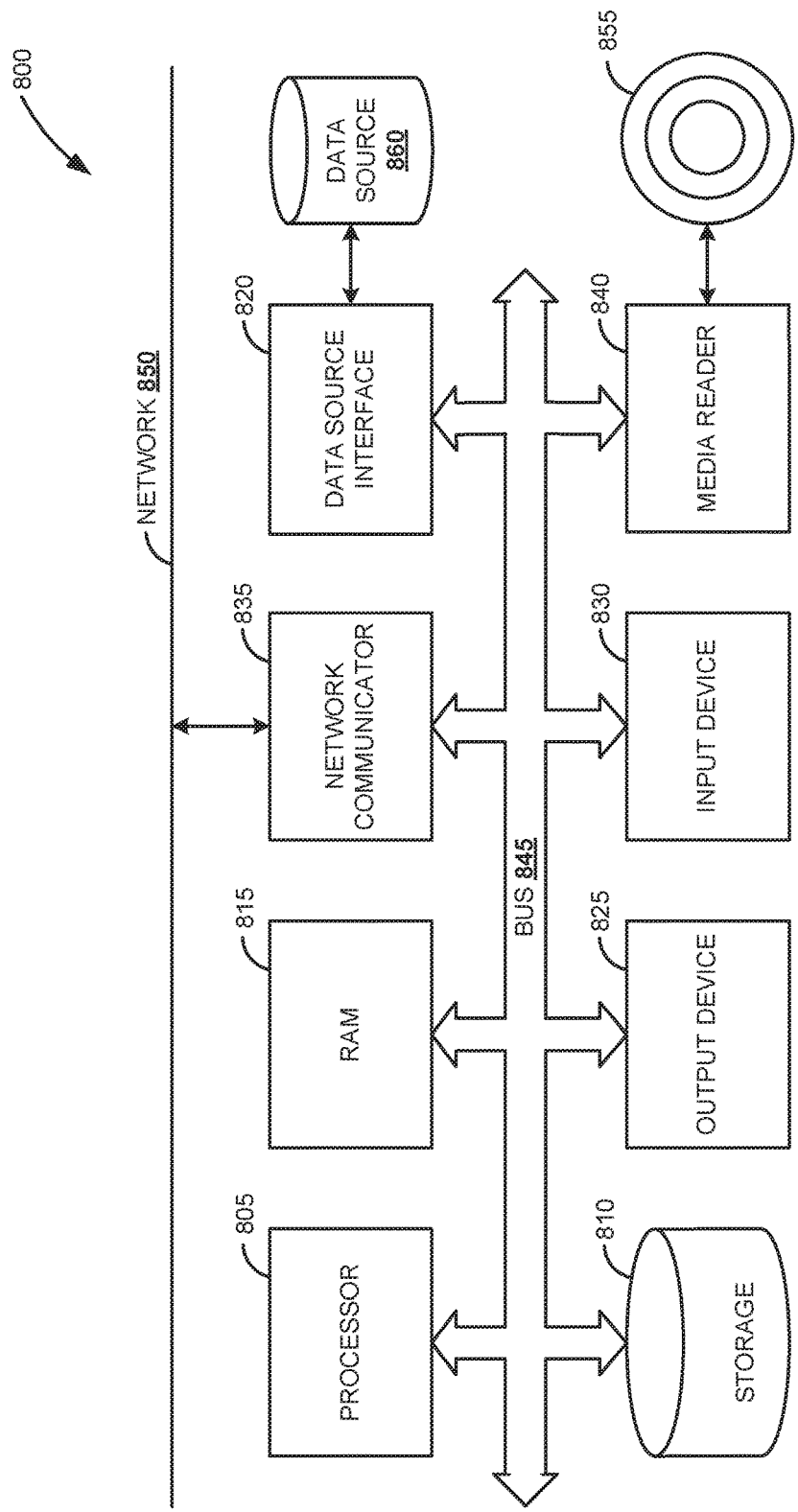
FIG. 8 is a block diagram illustrating an exemplary computer system, according to an embodiment.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. The output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to perform operations comprising:
   from a device, receiving a request for creating an analytical file corresponding to a document stored on a server;
   retrieving, from the device, a business intelligence archive resource (BIAR) file related to the document, wherein the BIAR file includes metadata related to the document and connection details of the server;
   connecting to the server to retrieve the document and at least one of: values corresponding to the metadata, one or more annotations, and one or more operations related to the document from the server;
   integrating the retrieved document, the retrieved BIAR file, and the retrieved at least one of the values of the corresponding metadata, the one or more annotations, and the one or more operations to create the analytical file corresponding to the document; and
   storing the created analytical file locally on the device to enable accessing the document and the at least one of the values of the corresponding metadata, the one or more annotations, and the one or more operations related to the document, without being connected to the server.

2. The computer readable medium of claim 1 further comprising instructions which when executed by the computer cause the computer to:
   upon determining that a network connection is available with the server, upload the analytical file on the server or update an existing analytical file on the server to maintain the analytical file on the device and the analytical file on the server synchronized.

3. The computer readable medium of claim 1, wherein the one or more annotations are stored as an image file and the image file has a unique image file identifier (ID).

4. The computer readable medium of claim 3, wherein integrating comprises at least one of:

linking the image file ID to a document identifier (ID); and packaging the BIAR file together with the values of the corresponding metadata, the one or more annotations, and the one or more operations related to the document.

5. The computer readable medium of claim 1, wherein the connection details of the server include a name of the connection, a name of the server, a type of the server, and an IP address of the server.

6. The computer readable medium of claim 1 further comprising instructions which when executed by the computer cause the computer to:
receive a request for sharing the analytical file;
based upon the request, provide one or more options to share the analytical file through at least one of an email, one or more social media sites, and an enterprise communicator;
receive a selection of at least one option from the provided one or more options; and
share the analytical file to one or more recipients through the selected at least one option.

7. The computer readable medium of claim 1 further comprising instructions which when executed by the computer cause the computer to:
from the device, receive a request to connect to the server to retrieve information comprising at least one of the document, the values of the corresponding metadata related to the document, the one or more annotations, and the one or more operations related to the document;
based upon the request, determine whether the device is a registered device;
upon determining that the device is the registered device, provide an access to the server to retrieve the information; and
upon determining that the device is not the registered device, restrict the access to the server and display an error message.

8. A computer-implemented method for accessing documents, the method comprising:
from a device, receiving a request for creating an analytical file corresponding to a document stored on a server;
retrieving, from the device, a business intelligence archive resource (BIAR) file related to the document, wherein the BIAR file includes metadata related to the document and connection details of the server;
connecting to the server to retrieve the document and at least one of: values corresponding to the metadata, one or more annotations, and one or more operations related to the document from the server;
integrating the retrieved document, the retrieved BIAR file,and the retrieved at least one of the values of the corresponding metadata, the one or more annotations, and the one or more operations to create the analytical file corresponding to the document; and
storing the created analytical file locally on the device to enable accessing the document and the at least one of the values of the corresponding metadata, the one or more annotations, and the one or more operations related to the document, without being connected to the server.

9. The computer-implemented method of claim 8 further comprising:
from the device, receiving a request to connect to the server to retrieve information comprising at least one of the document, the values of the corresponding metadata related to the document, the one or more annotations, and the one or more operations related to the document;
based upon the request, determining whether the device is a registered device; upon determining that the device is the registered device, providing an access to the server to retrieve the information; and
upon determining that the device is not the registered device, restricting the access to the server and displaying an error message.

10. The computer-implemented method of claim 8 further comprising:
receiving a request for sharing the analytical file;
based upon the request, providing one or more options to share the analytical file through at least one of an email, one or more social media sites, and an enterprise communicator;
receiving a selection of at least one option from the provided one or more options; and
sharing the analytical file to one or more recipients through the selected at least one option.

11. The computer-implemented method of claim 8 further comprising:
upon determining that a network connection is available with the server, uploading the analytical file on the server or updating an existing analytical file on the server to maintain the analytical file on the device and the analytical file on the server synchronized.

12. A computer system for accessing mobile, the system comprising:
at least one memory to store executable instructions; and
at least one processor communicatively coupled to the at least one memory, the at least one processor configured to execute the executable instructions to:
from a device, receive a request for creating an analytical file corresponding to a document stored on a server;
retrieve, from the device, a business intelligence archive resource (BIAR) file related to the document, wherein the BIAR file includes metadata related to the document and connection details of the server;
connect to the server to retrieve the document and at least one of: values corresponding to the metadata, one or more annotations, and one or more operations related to the document from the server;
integrate the retrieved document, retrieved BIAR file, and the retrieved at least one of the values of the corresponding metadata, the one or more annotations, and the one or more operations to create the analytical file corresponding to the document; and
store the created analytical file locally on the device to enable accessing the document and the at least one of the values of the corresponding metadata, the one or more annotations, and the one or more operations related to the document, without being connected to the server.

13. The system of claim 12, wherein the one or more annotations are stored as an image file and the image file has a unique image file identifier (ID).

14. The system of claim 13, wherein integrate the retrieved BIAR file comprises linking the image file ID to a document identifier (ID).

15. The system of claim 12, wherein integrating comprises packaging the BIAR file together with the values of the corresponding metadata, the one or more annotations, and the one or more operations related to the document.

16. The system of claim 12, wherein the device is one of a communication device, a computing device, a handheld device, a mobile device, an enterprise digital assistant (EDA), a personal digital assistant (PDA), a tablet computer, a smart phone, a desktop, and a laptop and wherein the connection details of the server include a name of the connection, a name of the server, a type of the server, and an IP address of the server.

17. The system of claim 12, wherein the processor is further configured to execute the executable instructions to: upon determining that a network connection is available with the server, upload the analytical file on the server or update an existing analytical file on the server to maintain the analytical file on the device and the analytical file on the server synchronized.

18. The system of claim 12, wherein the processor is further configured to execute the executable instructions to:
 from the device, receive a request to connect to the server to retrieve information comprising at least one of the document, the values of the corresponding metadata related to the document, the one or more annotations, and the one or more operations related to the document;
 based upon the request, determine whether the device is a registered device; upon determining that the device is the registered device, provide an access to the server to retrieve the information; and
 upon determining that the device is not the registered device, restrict the access to the server and display an error message.

19. The system of claim 12, wherein the processor is further configured to execute the executable instructions to:
 receive a request for sharing the analytical file;
 based upon the request, provide one or more options to share the analytical file through at least one of an email, one or more social media sites, and an enterprise communicator;
 receive a selection of at least one option from the provided one or more options; and
 share the analytical file to one or more recipients through the selected at least one option.

\* \* \* \* \*